Aug. 4, 1925.
W. J. EDKINS
1,548,586
SNAP FASTENER
Filed Oct. 7, 1924
3 Sheets-Sheet 1
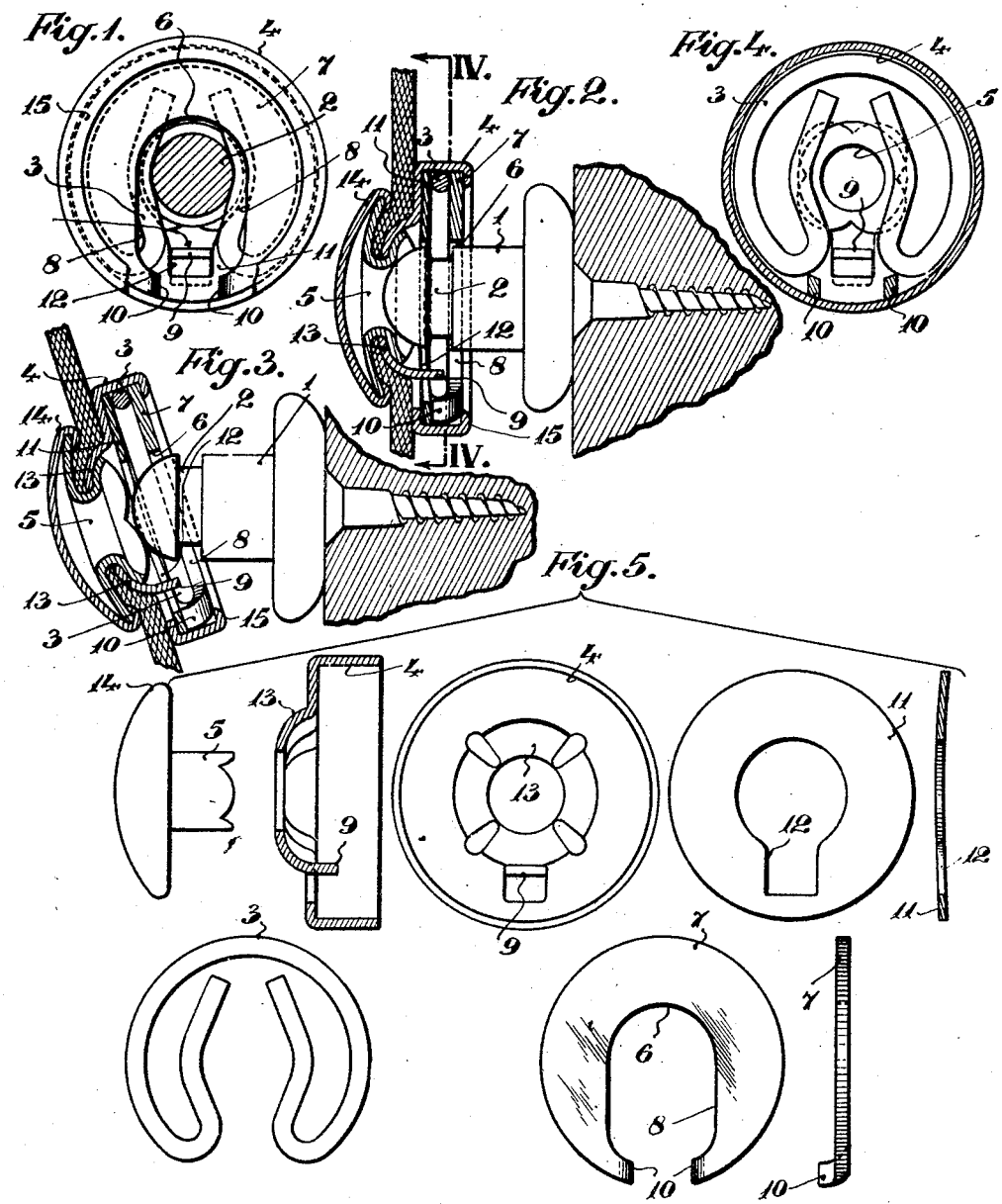
INVENTOR:
William John Edkins
BY: Francis E. Boyne
ATTORNEY Aug. 4, 1925.
W. J. EDKINS
1,548,586
SNAP FASTENER
Filed Oct. 7, 1924
3 Sheets-Sheet 2
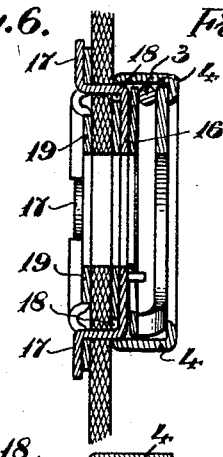
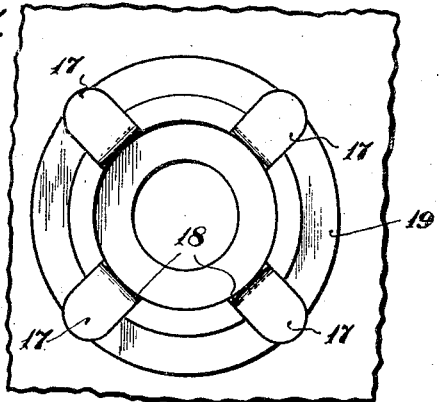
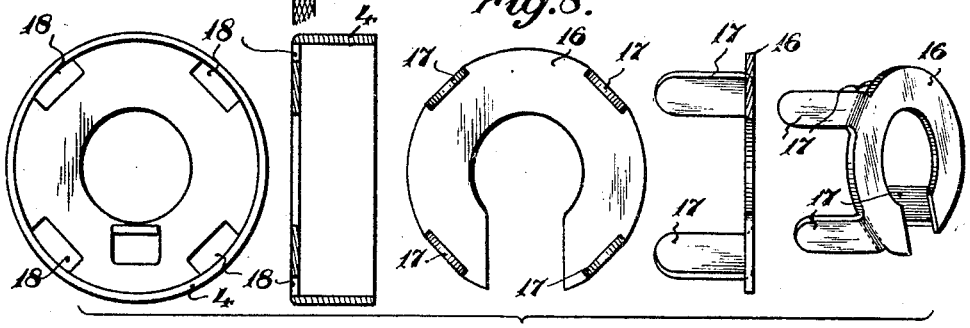
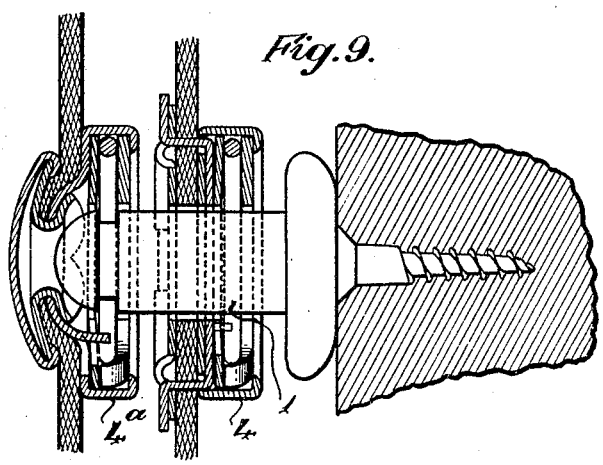
INVENTOR:
William John Edkins
BY: Francis E. Boyce
ATTORNEY Aug. 4, 1925.

W. J. EDKINS 1,548,586

SNAP FASTENER

Filed Oct. 7, 1924

INVENTOR:
William John Edkins
BY: Francis E. Boyer
ATTORNEY

Patented Aug. 4, 1925.

1,548,586

UNITED STATES PATENT OFFICE.

WILLIAM JOHN EDKINS, OF BIRMINGHAM, ENGLAND.

SNAP FASTENER.

Application filed October 7, 1924. Serial No. 742,118.

*To all whom it may concern:*

Be it known that I, WILLIAM JOHN EDKINS, subject of the King of Great Britain, residing at Birmingham, England, have invented new and useful Improvements in Snap Fasteners, of which the following is a specification.

This invention relates to two-part stud-and-socket snap fasteners of the kind in which a shouldered stud member, when engaged with the spring of the socket member, is positively locked to the latter against a direct axial pull, and can only be disengaged therefrom by a relative tilting or tipping action in one particular direction, this being ensured by the provision of a stop or abutment formed by one end of an elongated or equivalent opening (adapted to be engaged by the stud) in a plate at the inner or front side of the socket, that is, the side that is opposed to the stud member.

The object of the present invention is to provide an improved and simplified construction of this type of fastener which admits of being cheaply manufactured.

Figure 1 of the accompanying drawings represents a front elevation, partly in section, of the socket member of a tip-action fastener made in accordance with the present invention, the stud member (in section) being shown engaged with the socket.

Figure 2 represents a vertical section through the fastener with the stud and socket members engaged, the stud member being shown in elevation.

Figure 3 is a similar sectional view to Figure 2, but shows the fastener being separated by tilting the socket relatively to the stud.

Figure 4 represents a section through the casing of the socket on line IV—IV, Figure 2, showing the spring in elevation.

Figure 5 shows the various component parts of the socket disassembled.

Figure 6 is a section through a modification in which the socket is attached to the material by means of a plate having prongs adapted to be clenched over.

Figure 7 is a back view showing how this socket member is attached.

Figure 8 shows the socket body and the attachment plate separately.

Figure 9 represents a modification in which one socket, after being engaged with the head of a long stud, is adapted to be passed on to the shank of the latter to enable another socket to be engaged with the head.

Figure 10:
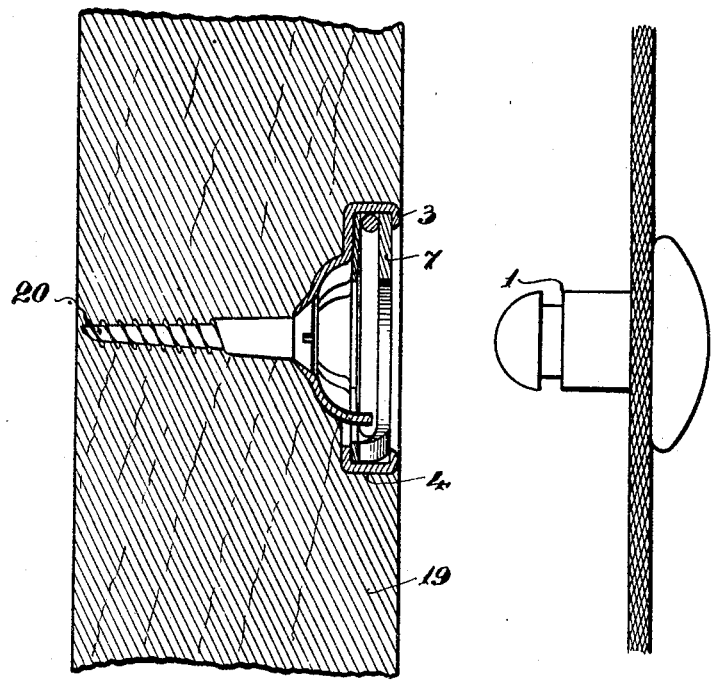
Figure 10 shows a further modification.

Referring to Figures 1 to 5, the stud member 1 has a rounded end and a straight-sided groove or neck 2 for engagement by the gripping spring. The socket member comprises a circular body part or casing 4 consisting of a back plate having a central opening for attachment to the material by an eyelet 5, and an upturned circular wall or rim at the edge. Placed within the body or casing 4 is a wire spring 3 of any suitable type, but conveniently of the kind consisting of a circular outer part whose ends are inturned to form a pair of diametrically-disposed spring arms or branches, the middle portions of which may be slightly bowed outwards in order to receive the stud between them and to engage the groove or neck thereof with a snap action. Upon the outside of the spring is placed a circular plate or disc 7 forming the front of the socket and secured in place by closing-over the rim or side-wall of the body or casing 4, as at 15. This front plate or disc 7 is provided with a radially-disposed slot 8 of a width approximately equal to the diameter of the stud and arranged with its longitudinal axis mid-way between the branches of the spring. One end 6 of this slot 8 is situated adjacent the stud 1 when the latter is engaged with the spring, and is of semi-circular shape, the centre being coincident with the axis of the stud, so that the said end of the slot closely engages around one half of the periphery of the stud, and acts as a stop to prevent the latter from being tilted in that direction. The slot 8 extends to the edge of the disc, this end of the slot being open, thus providing a clearance for the tilting or tipping of the stud in that direction.

In order to locate the spring 3, within the body of the socket, and prevent its rotation, a small tongue 9 is raised out of the bottom of the body part so as to engage between the branches of the spring; and the top slotted plate or disc 7 may be prevented from rotating by turning down two lugs 10, 10, at the open end of the slot so as to engage the spring. A convex spring washer 11 may also be placed within the body part beneath the spring, a notch 12 being provided in it through which extends the raised spring-locating tongue 9 on the bottom of the body.

The bottom of the body may conveniently be recessed or set back around the central opening, as at 13, to accommodate the attachment eyelet 5, and the latter is preferably carried by a domed back-plate 14. In operation the stud 1 is engaged with the bowed middle part of the spring of the socket member in the ordinary way, as shown in Figure 2, but it cannot be withdrawn by a direct axial pull owing to the said spring engaging behind the square shoulder of the groove or neck. To release the stud, it is necessary to tilt or tip the same relatively to the socket member in the longitudinal direction of the branches of the spring and away from the free ends thereof, as shown in Figure 3, so that the head of the stud will engage between the arms of the spring and forcibly pry the same apart, until the stud leaves the socket. Tipping of the stud in any other direction is positively prevented by the end 6 of the slot 8 engaging the stud.

As shown in Figures 6 to 8, instead of the socket 4 being attached to the material by means of an eyelet, as in Figures 1 to 5, it may be attached by bent-over prongs, for which purpose there is placed within the body, beneath the spring 3, a plate 16 having prongs 17 bent back at right-angles and passed through slots 18 in the bottom of the socket body (Figure 8). These prongs are adapted to be inserted through the material and clenched on to a washer 19 at the back.

Figure 9 shows the application of the invention to a fastener in which the socket 4, after being engaged with the head of a long stud 1, is adapted to be passed on to the shank of said stud, to enable another socket 4ª to be engaged with the head. The bottom of the body part of the socket 4 is provided with a central aperture to allow the socket to be pushed on to the said shank, being attached to the material as shown in Figure 6. The socket 4, although capable of sliding on the shank, can only be detached from the head by tilting it in one direction as previously described.

In the arrangement shown in Figure 10, the stud 1 is carried by the fabric or like material, and the socket 4, containing the spring 3 and slotted front plate 7, is let into a recess in the woodwork 19 such as the body of a motor-car, flush with the surface thereof, being secured by a screw 20.

Having fully described my invention, what I desire to claim and secure by Letters Patent is:—

1. A tip-action separable fastener comprising in combination, a socket including a casing, means for attaching the back of the casing to the part by which the socket is to be carried, a spring within the casing having resilient branches, a stud having a neck portion adapted to engage between the branches of the spring within the casing, said stud having a head provided with a locking shoulder adapted to prevent disengagement of the stud from the socket by a direct axial pull, means for locating and preventing rotation of the spring within the casing, and a plate disposed within the casing in front of the spring, said plate having a stud-receiving opening which prevents tilting of the socket relatively to the stud other than in one direction only, and also having turned-down lugs engaging with the spring.

2. A tip-action separable fastener comprising, in combination, a socket including an open-fronted casing, means for attaching the back of the casing to the part by which the socket is to be carried, a spring within the casing having resilient branches, a stud having a neck portion adapted to engage between the branches of the spring within the casing, said stud having a head provided with a locking shoulder adapted to prevent disengagement of the stud from the socket by a direct axial pull, a locating projection on the back of the casing engaging between the branches of the spring, and a plate disposed within the casing in front of the spring and held in place by closing over the edge of the casing, said plate having an elongated stud-receiving opening extending to the edge of the plate to allow of tilting of the socket relatively to the stud in one direction only, and also having a pair of turned-down lugs adjacent the outer end of the elongated opening in order to engage with the spring.

In testimony whereof I have signed my name to this specification.

WILLIAM JOHN EDKINS.